United States Patent
Kim et al.

(10) Patent No.: US 6,552,884 B2
(45) Date of Patent: Apr. 22, 2003

(54) CIRCUIT BREAKER WITH DISPLAY FUNCTION

(75) Inventors: Jeong-Wan Kim, Bucheon-si (KR); Cheon-Youn Kim, Yeonsu-gu (KR); Dong-Sub Kim, Gyeongsan-si (KR); Gi-Jong Ban, Bucheon-si (KR)

(73) Assignee: Human El Tech, Inc., Gyeonggi-do (KR)

( * ) Notice: Subject to any disclaimer, the term of this patent is extended or adjusted under 35 U.S.C. 154(b) by 0 days.

(21) Appl. No.: 10/014,815

(22) Filed: Dec. 14, 2001

(65) Prior Publication Data

US 2002/0085326 A1 Jul. 4, 2002

Related U.S. Application Data

(63) Continuation-in-part of application No. 09/852,117, filed on May 10, 2001.

(30) Foreign Application Priority Data

May 12, 2000 (KR) .................................. 2000-0025385
Apr. 25, 2001 (KR) .................................. 2001-0022392

(51) Int. Cl.$^7$ ................................................ H02H 3/33
(52) U.S. Cl. ........................ 361/42; 361/93.2; 340/650; 340/664
(58) Field of Search .............................. 361/42, 45, 71, 361/78, 93.1, 93.2; 340/664, 657, 650

(56) References Cited

U.S. PATENT DOCUMENTS 5,220,479 A  *  6/1993  Fraisse ........................ 340/664
5,546,266 A  *  8/1996  Mackenzie et al. ......... 340/638
6,049,143 A  *  4/2000  Simpson et al. ............ 307/126

\* cited by examiner

*Primary Examiner*—Kim Huynh
(74) *Attorney, Agent, or Firm*—Rabin & Berdo, P.C.

(57) ABSTRACT

A circuit breaker which displays electronically state of the circuit breaker and the cause of the disconnection which enables users to determine whether to reconnect a conductor which connects a source and a load in power distribution system. An arc display part is coupled to an arc fault detector, a ground display part is coupled to a ground fault detector and an overload display part is coupled to an overload detector. If arc fault occurs, the arc fault detector generates a trip signal and the trip signal is provided to the arc display part. As the trip signal from the arc fault detector is not provided to the ground display part and the overload display part, users can determine that arc fault has occurred by the lighting of the arc display part.

17 Claims, 10 Drawing Sheets

CIRCUIT BREAKER WITH DISPLAY FUNCTION

CROSS-REFERENCE TO RELATED APPLICATION

This application is a Continuation-In-Part of copending application Ser. No. 09/852,117 filed May 10, 2001.

The entire disclosures of applicants' Korean patent application numbers KR 2000-0025385 and KR 2001-0022392 are incorporated herein by reference.

FIELD OF THE INVENTION

The present invention relates to a circuit breaker, more particularly to a circuit breaker which displays the cause of the disconnection of a conductor connecting the source and the load in a power distribution system and is not affected by the excessive voltage.

BACKGROUND OF THE INVENTION

Wiring circuit interrupters and current leakage circuit interrupters are commonly used devices for protecting people and property from fire and dangerous electrical faults. Wiring circuit interrupters are used to protect power lines. The circuit interrupters are tripped by the bending of an internal bimetal when excessive current passing through a circuit breaker is converted to heat. The circuit interrupters are also tripped causing the bimetal to heat up and bend when an electric tool or other metallic object on the load shorts the power line and high current is passed through instantaneously. This causes the electric device to be interrupted by the inner magnet of the circuit interrupter.

There are three cases where an incident like fire may happen during power transmission. The three cases are incidents by an arc fault, a ground fault and an overload, respectively.

The overload occurs when the excessive current flows from the source to the load, which is usually caused when many electronic devices are used simultaneously. The overload often occurs when air conditioners are used in summer. If excessive current flows, the bimetal emits the heat and the inner bimetal is bent, which results in disconnection of the conductor connecting the source and the load.

The ground fault occurs if there are metallic materials near the conductor of which a coating is stripped off. If the ground fault occurs, there may occur leakage current, which results in electric shock.

The causes of an arc fault are numerous. For example, it may be caused by overuse, excessive currents or lightning strikes, loose connection or excessive mechanical damage to insulation and wires. According to the Consumer Product Safety Commission (CPSC), it was estimated that 40% of the fires in 1997 were due to arc faults. The National Electric Code (NEC) requires AFCI installation in all the residential buildings beginning in January 2002.

The overload and the ground faults are temporary. Therefore, users may reconnect the conductor although the conductor is disconnected by the overload or the ground fault.

However, as the arc faults are caused by defects of the conductor, users should not reconnect the conductor until the fundamental defect of the conductor is resolved.

Therefore it is helpful for users to display the cause of the disconnection of the conductor, which allows users to determine whether to reconnect the conductor.

The circuit breaker of the prior art have displayed the state of the circuit breaker only mechanically by changing the state of a switch or changing the color expressed in a certain outer portion of the circuit breaker.

However, above mechanical display methods fail to display the cause of disconnection and users can't see the state of the circuit breaker at night if the display is made mechanically.

Therefore, it is necessary to display the state of the circuit electronically. However, there has been difficulty to display the state of the circuit electronically as power can't be provided if the circuit breaker disconnects the conductor connecting the source and the load.

Moreover, most countries require that the circuit breaker should overcome regular voltage which is relatively high. For example, the United States of America requires that the circuit breaker should overcome 1240V. As most of circuit elements cannot overcome a voltage over 1000V, it is still more difficult to display the state of the circuit breaker and the cause of the disconnection electronically.

SUMMARY OF THE INVENTION

In order to resolve the above-described problems in the conventional circuit breaker, the present invention intends to provide a circuit breaker which is able to display the state of a circuit breaker electronically.

Another purpose of the present invention is to provide a circuit breaker which enables users to determine whether to reconnect the circuit, by displaying the cause of disconnection electronically.

Another purpose of the present invention is to provide a circuit breaker which is able to display the state of the circuit breaker although the circuit is disconnected, for example on overload.

Another purpose of the present invention is to provide a circuit breaker which is able to display the state of the circuit breaker although a high voltage is applied to the circuit breaker.

In order to above-mentioned objective, a circuit breaker according to the invention comprises at least one of an arc fault detector, a ground fault detector, and an overload detector and disconnects a conductor coupling a source and a load if at least one of the arc fault detector, the ground fault detector and the overload detector generates a trip signal. The circuit breaker further comprises means for displaying the state of the circuit breaker and the cause of the disconnection if the conductor is disconnected by the trip signal generated from at least one of the arc fault detector, the ground fault detector and the overload detector, and means for resetting the means for displaying if the disconnected conductor is reconnected, wherein the means for displaying is driven by an independent source.

The means for displaying may comprise at least one of an arc fault display means displaying the state of arc fault responsive to the trip signal from the arc fault detector, a ground fault display means displaying the state of ground fault responsive to the trip signal from the ground fault detector, and an overload display means displaying the state of overload responsive to the trip signal form the overload detector.

The arc fault display means, the ground fault display means and the overload display means may comprise a silicon controlled rectifier, respectively, in order to form a closed circuit with the independent source responsive to the trip signal.

The arc fault display means, the ground fault display means and the overload display means may comprise an NPN transistor and a PNP transistor respectively in order to form closed circuit with the independent source responsive to the trip signal, wherein the trip signal is provided to the base of the NPN transistor, and the collector of the NPN transistor is coupled to the base of the PNP transistor.

The arc fault display means, the ground fault display means and the overload display means may comprise a light emitting diode which is driven responsive to the trip signal.

The reset means may comprise a bipolar junction transistor.

The reset means may comprise a field effect transistor.

The trip signal may be provided to a base of the bipolar junction transistor, an emitter of the bipolar junction transistor is grounded, and a collector of the bipolar junction transistor is coupled to the independent source.

The means for displaying comprises a microprocessor, a digital display and at least one of a first level detector, a second level detector and a third level detector, wherein the first level detector coupled to the arc fault detector generates an output signal in case of receiving the trip signal from the arc fault detector, the second level detector coupled to the ground fault detector generating an output signal in case of receiving the trip signal from the ground fault detector, the third level detector coupled to the overload detector generating an output signal in case of receiving the trip signal from the overload detector. The microprocessor receives the output signal from one of the first level detector, the second level detector and the third level detector, determines state of the conductor and the cause of the disconnection and generates a control signal according to the result of the determination. The digital display displaying the state of the conductor and the cause of disconnection according to the control signal from the microprocessor.

The independent source may be a battery.

The independent source may be a storage battery.

DETAILED DESCRIPTION OF THE PREFERRED IMPLEMENTATION

Hereinafter, preferred embodiments of the present invention will be described in more detail with reference to the accompanying drawings.

Figure 1:
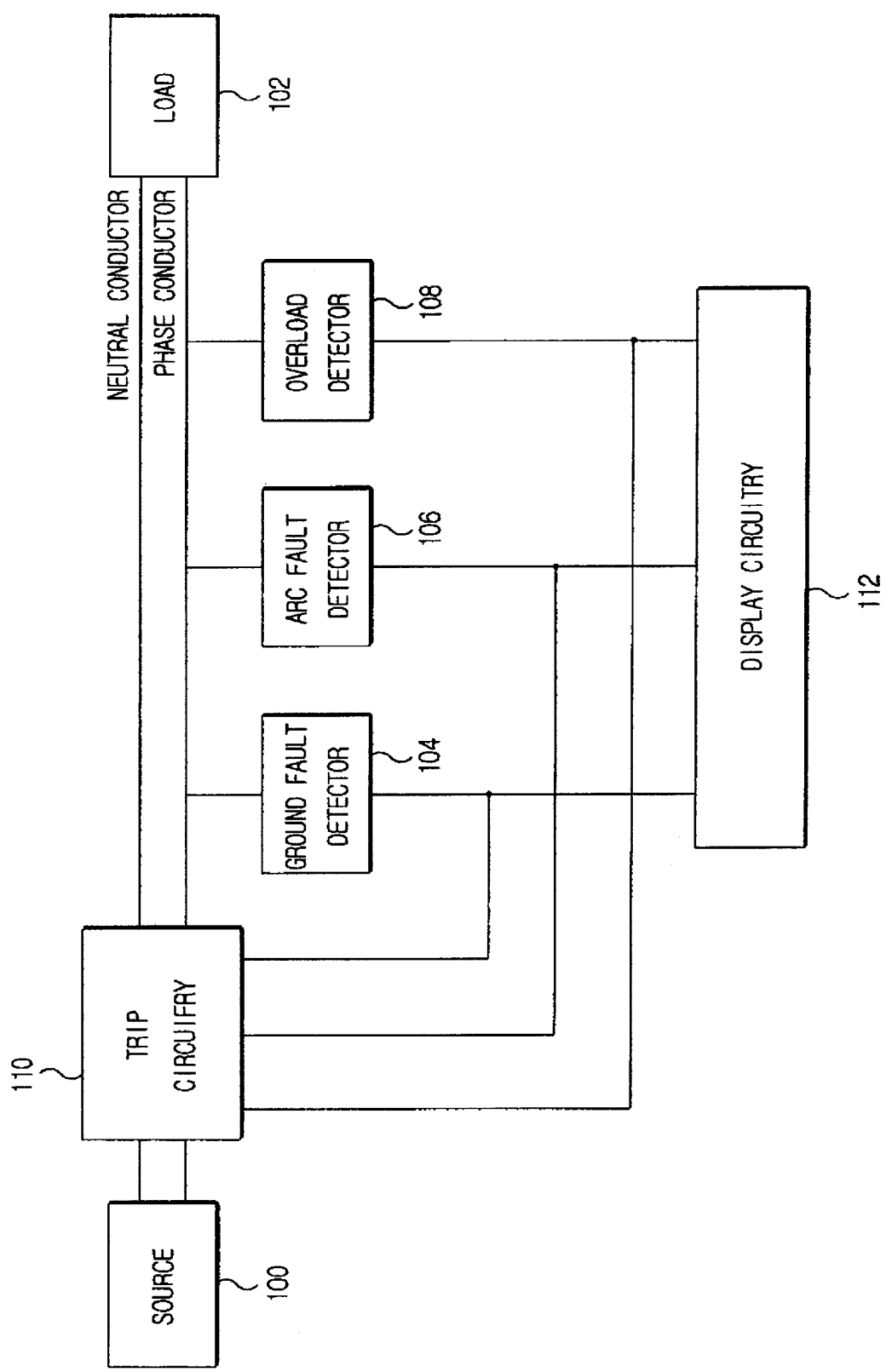
FIG. 1 is a block diagram of the circuit breaker according a preferred embodiment of the present invention.

FIG. 1 is a block diagram of the circuit breaker according a preferred embodiment of the present invention.

As shown in FIG. 1, the circuit breaker according to a preferred embodiment of the present invention may comprise a ground fault detector 104, an arc fault detector 106, an overload detector 108, trip circuitry 110 and display circuitry 112.

The arc fault detector 106 determines if an arc fault has occurred by detecting the variance of the current flowing on a phase conductor between a source 100 and a load 102, and if an arc fault has occurred, the arc fault detector 106 generates a first trip signal and transmits it to the trip circuitry 110 and the display circuitry 112.

In accordance with the preferred embodiment of the present invention, the arc fault detector 106 detects the occurrence of an arc fault only when the arc fault continues for a predetermined time, which is in order to distinguish a harmful arc which causes fire with the arc by the start of the electronic device although variance of the current is high.

The ground fault detector 104 determines if a ground fault has occurred by comparing the current of a phase conductor and a current on the neutral conductor, and if a ground fault has occurred, the ground fault detector generates a second trip signal and transmits it to the trip circuitry 110 and the display circuitry 112.

The overload detector 108 determines if an overload has occurred by measuring the current flowing on the phase conductor and if an overload has occurred, the overload detector 108 generates the third trip signal and transmits it to the trip circuitry 110 and the display circuitry 112.

The trip circuitry 110 disconnects the phase conductor in order to separate the source 100 from the load 102 when the trip circuitry 110 receives a trip signal from one of the arc fault detector 106, ground fault detector 104 and overload detector 108.

The display circuitry 112 displays the cause of the disconnection of the phase conductor when the phase conductor is disconnected on account of the trip signal generated by one of the ground fault detector 104, the arc fault detector 106 and the overload detector 108. In accordance with the preferred embodiment of the present invention, the display circuitry 112 comprises a light emitting diode (LED) and displays the cause of the disconnection by lighting the light emitting diode (LED). In accordance with another embodiment of the present invention, the display circuitry may display the cause of the disconnection using a digital display.

Figure 2:
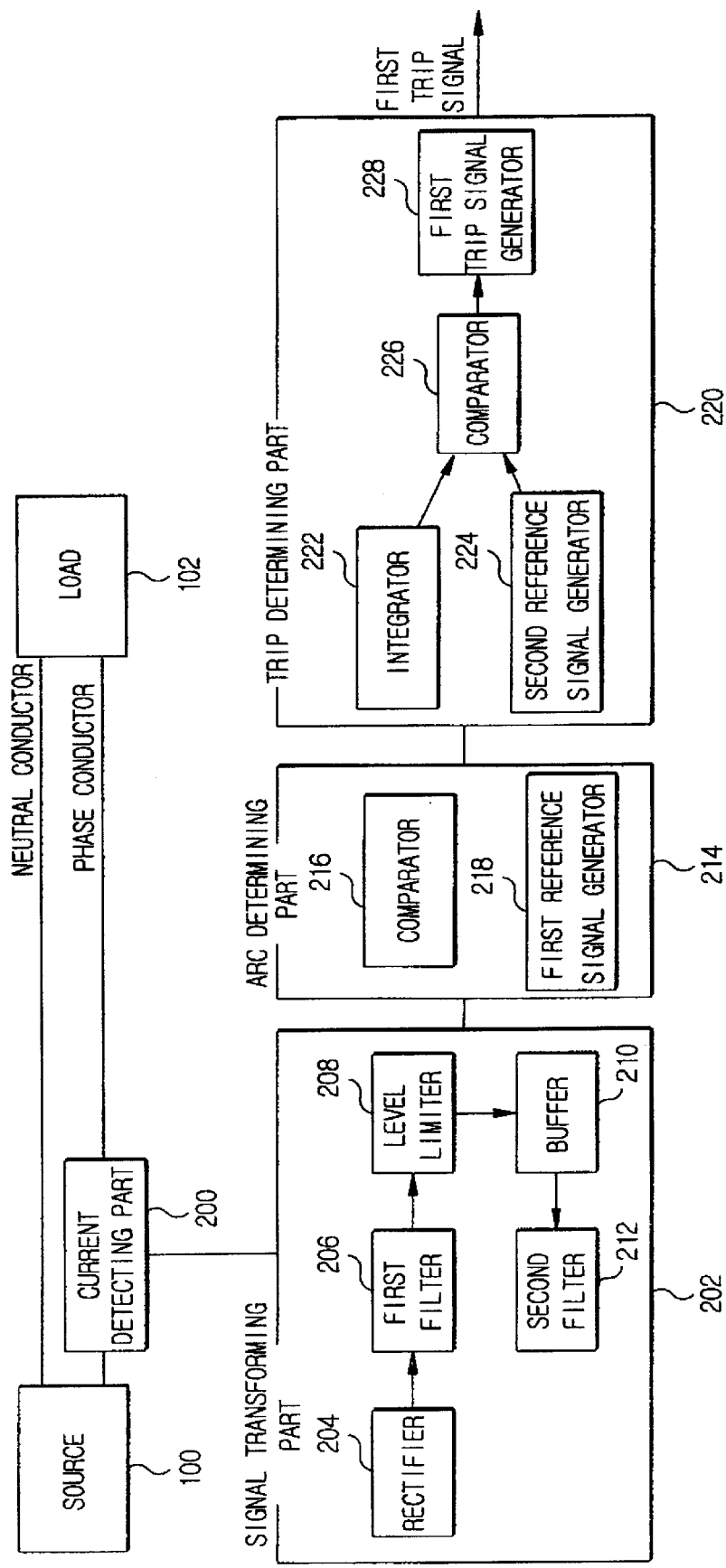
FIG. 2 illustrates a schematic block diagram of the arc fault detector according to the preferred embodiment of the present invention.

FIG. 2 illustrates a schematic block diagram of the arc fault detector 106.

As shown in FIG. 2, the arc fault detector 106 may comprise a current detecting part 200, a signal transforming part 202, an arc determining part 214 and a trip determining part 220.

The current detecting part 200 detects the variation of the current flowing on the phase conductor and outputs a detection signal proportional to the variance of the current. The detection signal may be outputted in the form of voltage in case of using a current transformer. However it would be possible that the detection signal may be outputted in the form of another physical quantity in the case of using a current detecting mean other than a current transformer.

In FIG. 2, although the current detecting part 200 is illustrated to be coupled to the phase conductor connecting the source 100 and the load 102, the current detecting part can also be coupled to both of the phase conductor and the neutral conductor.

In accordance with the preferred embodiment of the present invention, the current detecting part may comprise a current transformer and a resistor coupled to the current transformer. However, the current detecting part 200 is not limited to the current transformer.

The signal transforming part 202 may comprise a rectifier 204, a first filter 206, a level limiter 208, a buffer 210 and a second filter 212.

The rectifier 204 rectifies the output signal from the current detecting part 200 and outputs a rectification signal. The rectifier 204 may comprise general diodes. Full wave rectification by rectifier 204 may be performed using four or two diodes, and half wave rectification may also be performed using one diode.

The first filter 206 may be a high pass filter. The first filter 206 blocks the low frequency signal from the rectification signal and passes the high frequency signal from the rectification signal as the low frequency signal is of no concern with the arc.

As the low frequency signal is blocked at the first filter, the level of the output signal from the first filter may be lower than the level of the rectification signal. The first filter may comprise a resistor and a capacitor, which is a conventional constitutional component of the high pass filter. However, other embodiments of high pass filter may be included in the scope of the present invention.

The level limiter 208 limits the signal level to a predetermined signal level, if the output signal from the first filter exceeds the predetermined signal level. In case of using a current transformer as the current detecting part 200, the level limiter 208 may limit the voltage level to the predetermined voltage level. However, limiting the current level may also be included in the scope of the present invention. For example, if the predetermined voltage level is 20V and 25V is outputted from the first filter, the level limiter limits the voltage level to 20V. Limiting the level is for stability of the circuit when the high voltage or current is outputted. In accordance with the preferred embodiment of the present invention, the level limiter may comprise a zener diode.

In accordance with the preferred embodiment of the present invention, the value of the resistor which is coupled to current transformer in parallel is determined so that the voltage generated by the dimmer is lower than the predetermined voltage in the level limiter 208.

The buffer 210 performs buffering of the outputted signal from the level limiter in order to provide a stable signal.

The second filter 212, like the first filter 206, is a high pass filter. The second filter 212 blocks the low frequency signal from the buffer 210 and passes the only high frequency signal. Although the first filter 206 performs the high pass filtering, there may occur other noises during the level limiting and buffering. Therefore the second filter 212 blocks noise again.

The arc determining part 214 may comprise a comparator 216 and the first reference signal generator 218.

The first reference signal generator 218 generates a reference signal and inputs the reference signal to the comparator 216. According to the preferred embodiment of the present invention, the reference signal is lower than the signal generated by start of the electronic device and harmful arc, and higher than the signal generated by operation of the dimmer. For example, if the voltage generated by start of the electronic device is 20V and the voltage generated by harmful arc is 22V and the voltage generated by the operation of the dimmer is 15V, the first reference voltage may be determined to be 18V.

The comparator 216 compares the output signal from the second filter 212 with the reference signal outputted from the first reference signal generator 218, and generates an arc detection signal if the output signal level from the second filter 212 is higher than the first reference signal. In accordance with the preferred embodiment of the present invention, the comparator 216 may comprise an operational (OP) amplifier, and in this case the arc detection signal may be outputted in the form of voltage. According to one embodiment, the arc detection signal may be a constant signal. According to another embodiment, the arc detection signal may be a signal proportional to the output signal from the second filter.

The trip determining part may comprise an integrator 222, a comparator 226, a second reference signal generator 224 and a first trip signal generator 228.

The integrator 222 receives the arc detection signal outputted from the comparator 216 of the arc determining part and integrates the arc detection signal. If the output signal from the comparator 216 is voltage, the integrator may comprise a capacitor. However, using other integrating means could be included in the scope of the present invention.

The second reference signal generator 224 generates the predetermined reference signal and inputs the second reference signal to the comparator 226. The comparator 226 compares the integrated signal from the integrator with the second reference signal, and if the integrated signal level is higher than the second reference signal level, the comparator 226 generates an output signal.

If the comparator 226 generates an output signal, the first trip signal generator 228 determines that a harmful arc has occurred, and generates the first trip signal which drives circuit disconnection and transmits the first trip signal to trip circuitry 110 and display circuitry 112.

Figure 3:
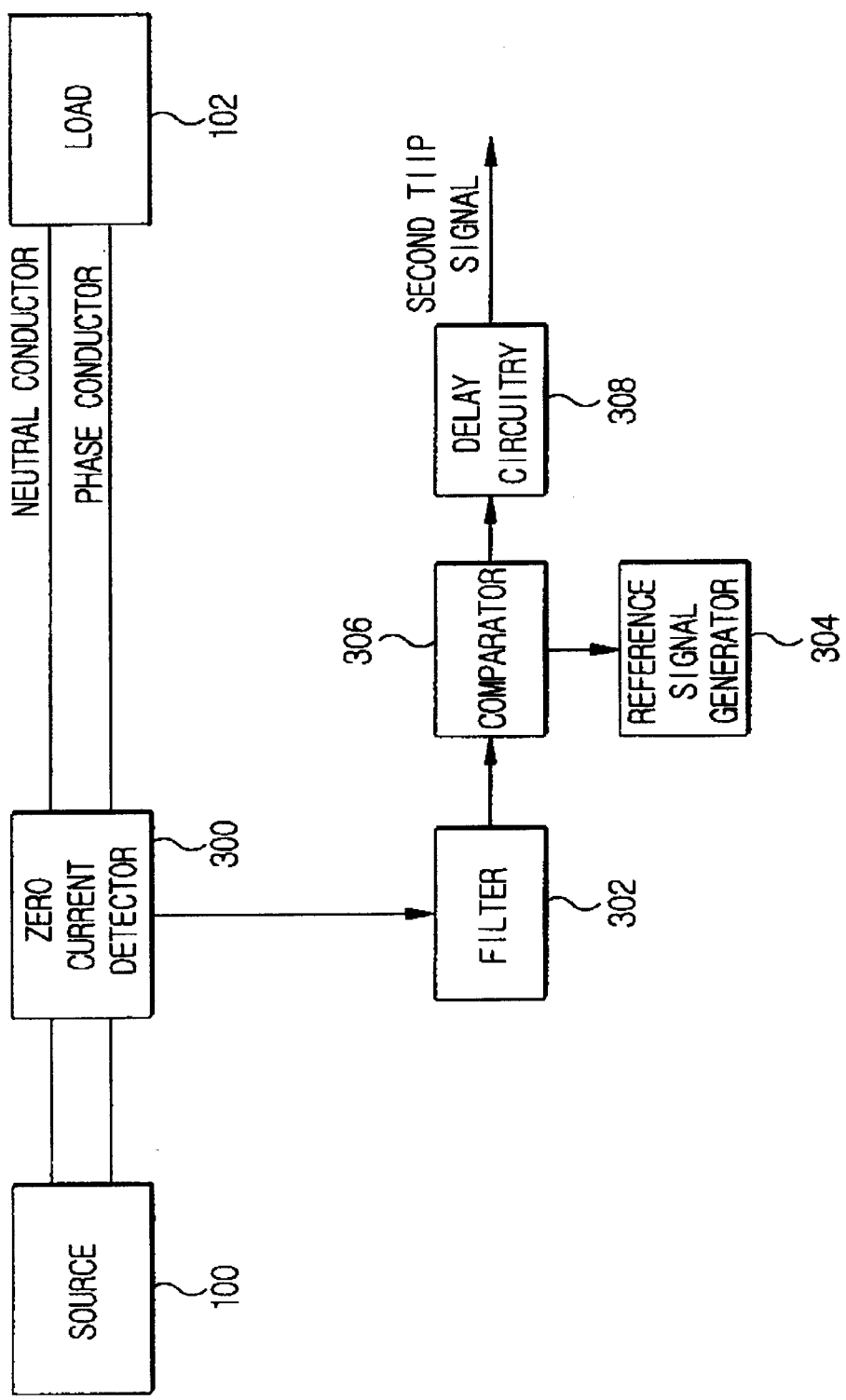
FIG. 3 illustrates a schematic block diagram of the ground fault detector according to the preferred embodiment of the present invention.

FIG. 3 illustrates a schematic block diagram of the ground fault detector according to the preferred embodiment of the present invention.

As shown in FIG. 3, the ground fault detector may comprise a zero current detector 300, a filter 302, a reference signal generator 304, a comparator 306 and a delay circuitry 308.

As shown in FIG. 3, the zero current detector 300 is coupled to the phase conductor and the neutral conductor. The zero current detector 300 compares the current inflow to the load with the current outflow from the load, and if the current inflow to the load and current outflow from the load is different, the zero current detector outputs a detection signal. According to the preferred embodiment of the present invention, a zero current transformer may be used as the zero current detector, and in this case the zero current transformer outputs the detection signal in the form of voltage.

The filter 302 blocks the low frequency signal from the detection signal and passes the high frequency signal.

The reference signal generator 304 generates the predetermined reference signal and provides the reference signal to the comparator 306.

The comparator 306 compares the output signal from the filter 302 with the reference signal from the reference signal generator 304 and generates a ground fault detection signal.

In accordance with the preferred embodiment of the present invention, the comparator 306 may be implemented using an operational amplifier, and in this case the ground fault detection signal may be outputted in the form of voltage.

The delay circuit 308 delays the ground fault detection signal, the output signal of the delay circuit is inputted to the trip circuitry 110 and the display circuitry 112 as the second trip signal.

Figure 4:
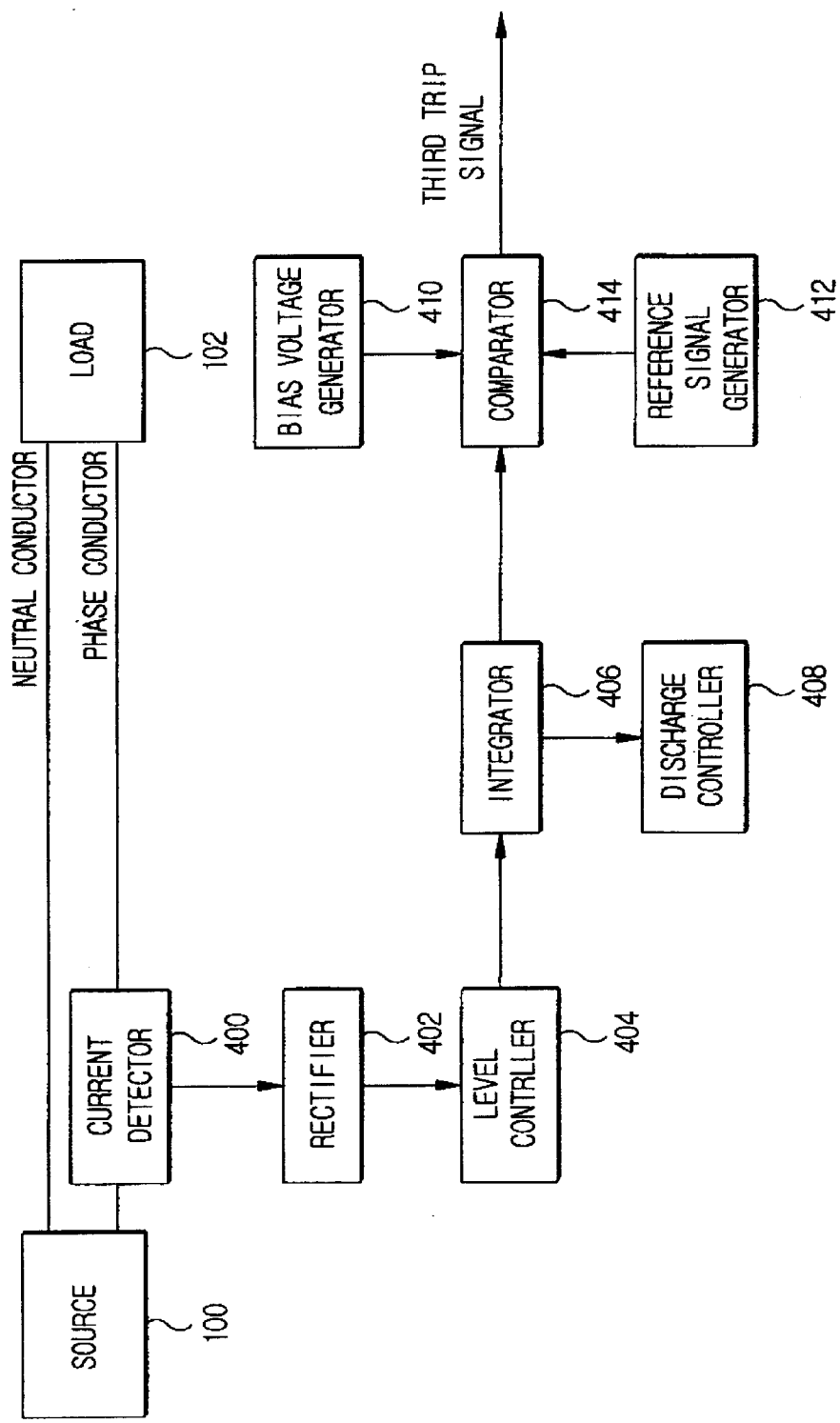
FIG. 4 illustrates a schematic block diagram of the overload detector according to the preferred embodiment of the present invention.

FIG. 4 illustrates a schematic block diagram of the overload detector according to the preferred embodiment of the present invention.

As shown in FIG. 4, the overload detector may comprise a current detector 400, a rectifier 402, a level controller 404, an integrator 406, a discharge controller 408, a bias voltage generator 410, a reference signal generator 412 and a comparator 414.

The current detector 400 is coupled to the phase conductor and generates a current detection signal proportional to the variance of current flowing on the phase conductor. The rectifier 402 rectifies the current detection signal.

The level controller 404 limits the signal level outputted from the rectifier 402 to a predetermined level if the signal level outputted from the rectifier 402 exceeds the predetermined signal level. In accordance with the preferred embodiment of the present invention, the signal level can be controlled using a zener diode.

The integrator 406 integrates the signal outputted from the level controller 404 continuously. According to the preferred embodiment of the present invention, the integrator 406 may comprise capacitor and operate to charge the voltage outputted from the level controller 404.

The reference signal generator 412 inputs the predetermined reference signal to the comparator 414.

The comparator 414 compares the signal outputted from the integrator with the reference signal, and if the signal outputted from the integrator exceeds the reference signal the comparator generates the third trip signal and transmit it to the trip circuitry 110 and the display circuitry 112.

The bias voltage generator 410 provides operation power source to the comparator 414.

Figure 5:
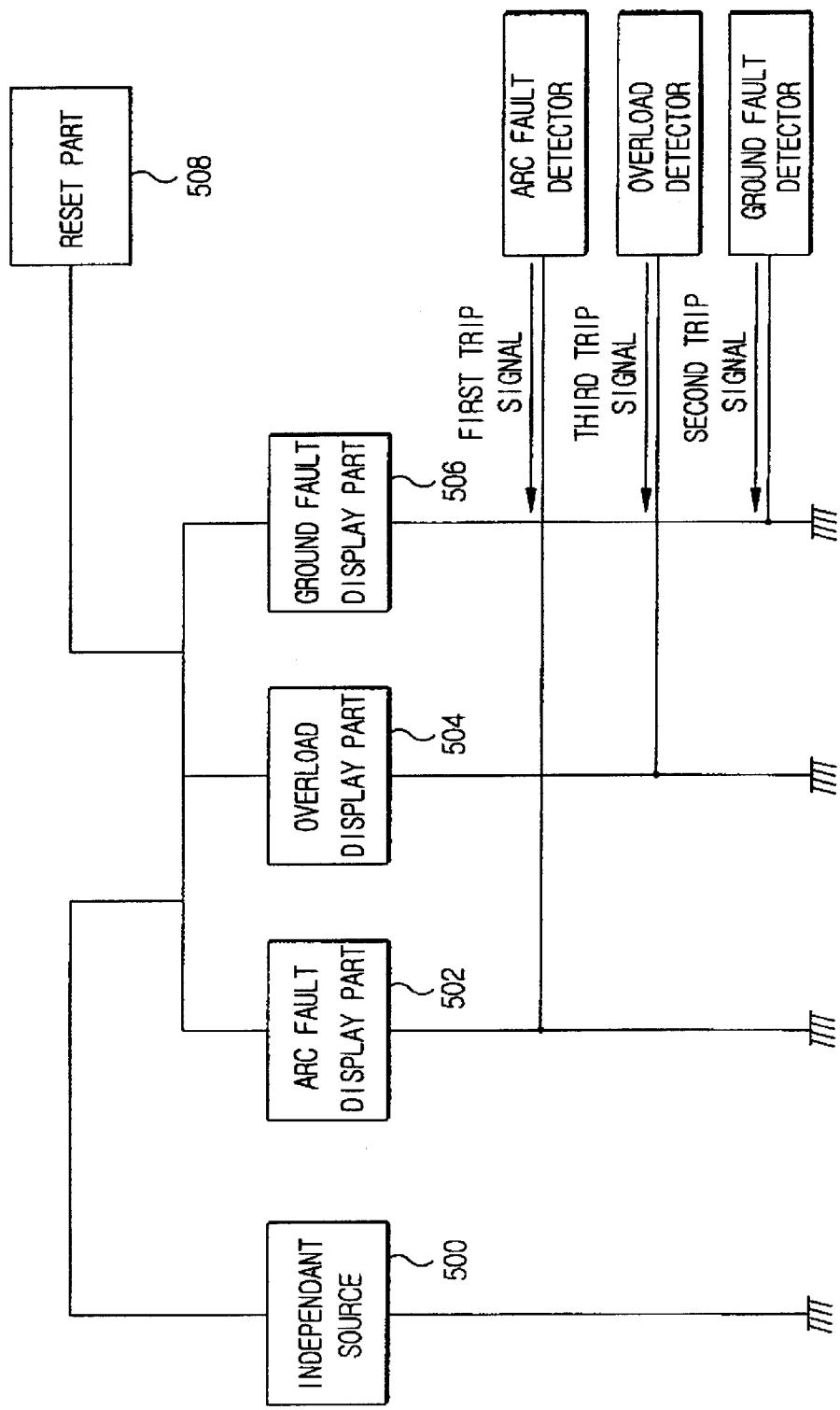
FIG. 5 illustrates a schematic block diagram of the display circuitry according to the preferred embodiment of the present invention.

FIG. 5 illustrates a schematic block diagram of the display circuitry according to the preferred embodiment of the present invention.

As shown in FIG. 5, the display circuitry 112 may comprise independent source 500, arc fault display part 502, overload display part 504, ground fault display part 506 and reset part 508.

The independent source 500 provides power source needed in operation of the display circuitry 112. The display circuitry 112 must display the cause of the disconnection after the phase conductor is disconnected. However, if the phase conductor is disconnected the display circuitry 112 cannot receive power from the source 100. Therefore using the independent source 500 is preferable.

Further, unless the independent source 500 is used, there is possibility that very high voltage from the source is inputted to the circuit, which results in damage of the circuit.

The arc fault display part 502 which is coupled to the arc fault detector receives the first trip signal from the arc fault detector and displays the state of the conductor connecting the source and the load that the conductor is disconnected because of an arc fault. The arc fault display part 502 is coupled to only the arc fault detector and is not coupled to the overload detector and the ground fault detector. Therefore, the arc fault display does not operate if the second or the third trip signal is generated from the overload detector or the ground fault detector.

The arc fault display part 502 forms the open circuit with the independent source 500 before the first trip signal is received. If the arc fault display part 502 receives the first trip signal, the arc fault display part 502 forms the closed circuit with the independent source 500 and power is provided to the arc fault display part 502 from the independent source 500.

The overload display part 504 is coupled to the overload detector and the ground fault display part 506 is coupled to the ground fault detector. If the second or the third trip signal is inputted to the overload display part 504 or the ground fault display part 506, the overload display part 504 or the ground fault display part 506 displays the state of the conductor that the conductor is disconnected because of the overload or the ground fault. Before the second or the third trip signal is inputted, the overload display part 504 or the ground fault display part forms the open circuit with the independent source 500.

According to the present invention, as the arc fault display part 502, overload display part 504 and the ground fault display part 506 are coupled to only the corresponding detector, the cause of the disconnection can be displayed. Users can determine whether to reconnect the conductor after confirming the cause of the disconnection. As mentioned above, users may reconnect the conductor if the cause of the disconnection is overload or ground fault. However, if the cause of the disconnection is arc, users may not reconnect the conductor.

The reset part 508 puts the display circuitry in a rest state if the circuit is reconnected, in order not to display the cause of the disconnection any more.

Figure 6:
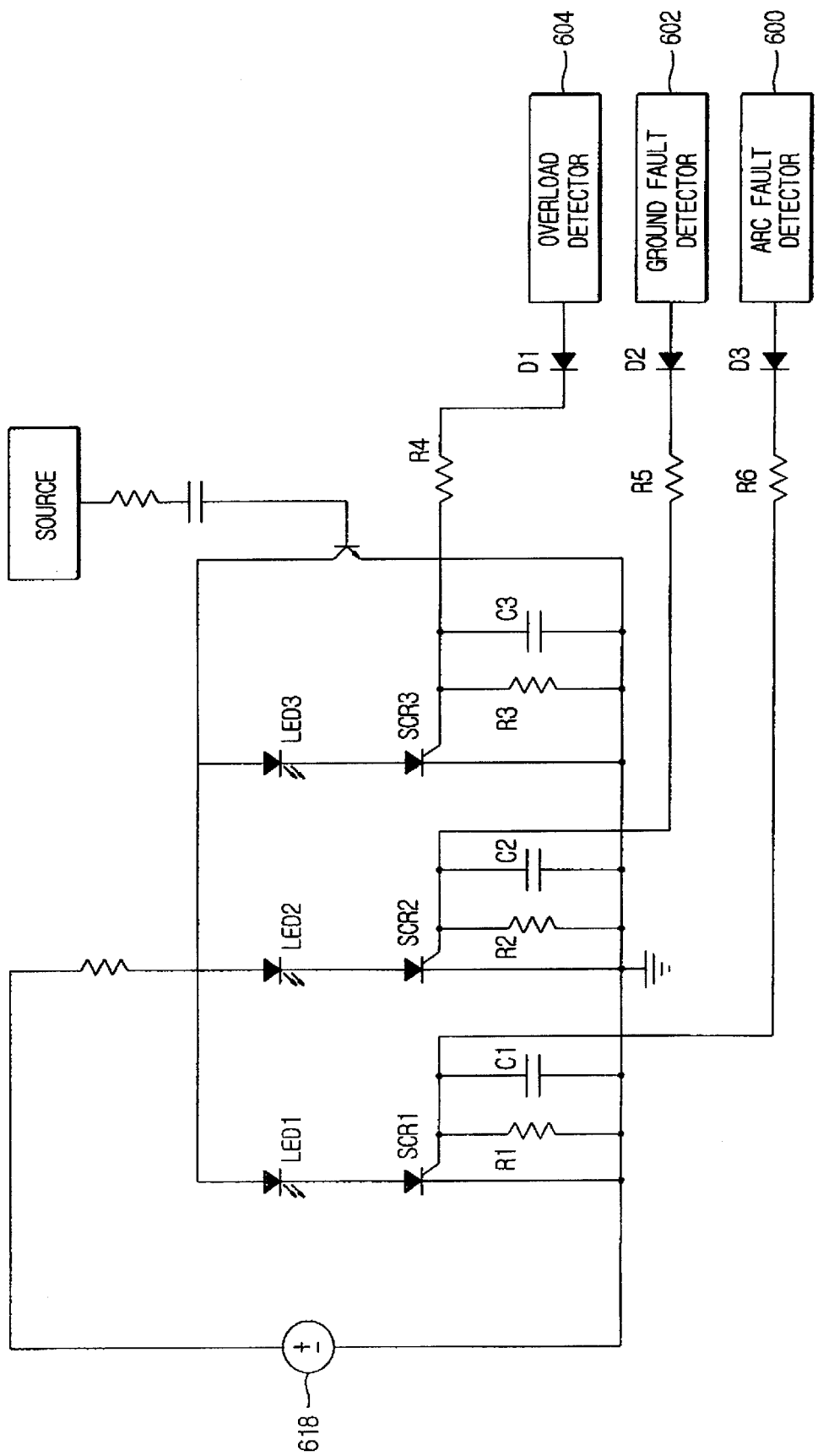
FIG. 6 illustrates a detailed circuit of the display circuitry according to the preferred embodiment of the present invention.

FIG. 6 illustrates a detailed circuit of the display circuitry according to the preferred embodiment of the present invention.

In FIG. 6, there are diodes D1, D2, D3 on the lines which are coupled to the arc fault detector, the ground fault detector and the overload detector respectively. The diodes D1, D2, D3 prevent reverse current, which is the general function of the diodes.

In FIG. 6, the arc fault display part 502 comprises a first light emitting diode LED 1 and a first silicon controlled rectifier SCR1, the ground fault display part 506 comprises a second light emitting diode LED2 and a second silicon controlled rectifier SCR2, and the overload display part 504 comprises a third light emitting diode LED3 and a third silicon controlled rectifier SCR3.

If the arc fault detector 600 generates the first trip signal, the first trip signal is provided to the gate of the first silicon controlled rectifier SCR1. The silicon controlled rectifier does not pass current between anode and cathode in a general state. However, if the voltage over the threshold of the silicon controlled rectifier is applied to the gate, the silicon controlled rectifier passes the current between anode and cathode.

If no trip signal is not inputted to the silicon controlled rectifier, the first silicon controlled rectifier SCR1, the second silicon controlled rectifier SCR2 and the third silicon controlled rectifier SCR3 maintain open circuit with the independent source 618 and light emitting diodes LED1, LED2, LED3 does not emit light. If the first trip signal from the arc fault detector 600 is inputted to the first silicon controlled rectifier SCR1, the independent source 618, the first light emitting diode LED1 and the first silicon controlled rectifier SCR1 form a closed circuit and the first light emitting diode LED1 emits light. From the light of the first light emitting diode LED1, users can determine that the circuit was disconnected by the arc fault. In this case, as no voltage is inputted to the gate of the second silicon controlled diode SCR2 and the third silicon controlled diode SCR3, the second light emitting diode LED2 and the third light emitting diode LED3 do not form a closed circuit with independent source and do not emit light.

The operation process when the second trip signal by the ground fault is inputted is the same as in the case of an arc fault. The second trip signal from the ground fault detector 602 is applied to the gate of the second silicon controlled rectifier SCR2 and the second silicon controlled rectifier SCR2 passes the current between the anode and the cathode. If the second silicon controlled rectifier SCR2 is turned on, the independent source 618, the second light emitting diode LED2 and the second silicon controlled rectifier SCR2 form a closed circuit and the second light emitting diode LED2 displays the cause of disconnection by emitting light.

Although the embodiment displays the cause of the disconnection of the conductor using a light emitting diode, using other elements besides light emitting diode also is included in the scope of the present invention.

Resistors R1, R2, R2 and capacitors C1,C2, C3 are coupled to the each of the silicon controlled rectifiers SCR1, SCR2, SCR3. Resistors R1, R2, R3 and capacitors C1, C2, C3 are for stable operation of the circuit and do not affect the function of the circuit.

The bipolar junction transistor Q1 operates as a reset means. The transistor Q1 is coupled to the source. If one of the arc fault detector 600, ground fault detector 602 and overload detector 604 generates a trip signal and the conductor is disconnected, the transistor Q1 is not turned on, and therefore does not affect the operation of the circuit. In accordance with another embodiment of the present invention, a field effect transistor (FET) can be used instead of the bipolar junction transistor.

If the conductor is reconnected after the disconnection, the transistor Q1 is turned on as the base of the transistor Q1 is provided with voltage. If the transistor Q1 is turned on, the voltage level of the collector is almost the same as the voltage level of the emitter. As shown in FIG. 6, as the emitter of the transistor Q1 is connected to the ground, the voltage level of the collector is almost 0, and therefore, current does not flow through the light emitting diodes LED1, LED2, LED3.

Figure 7:
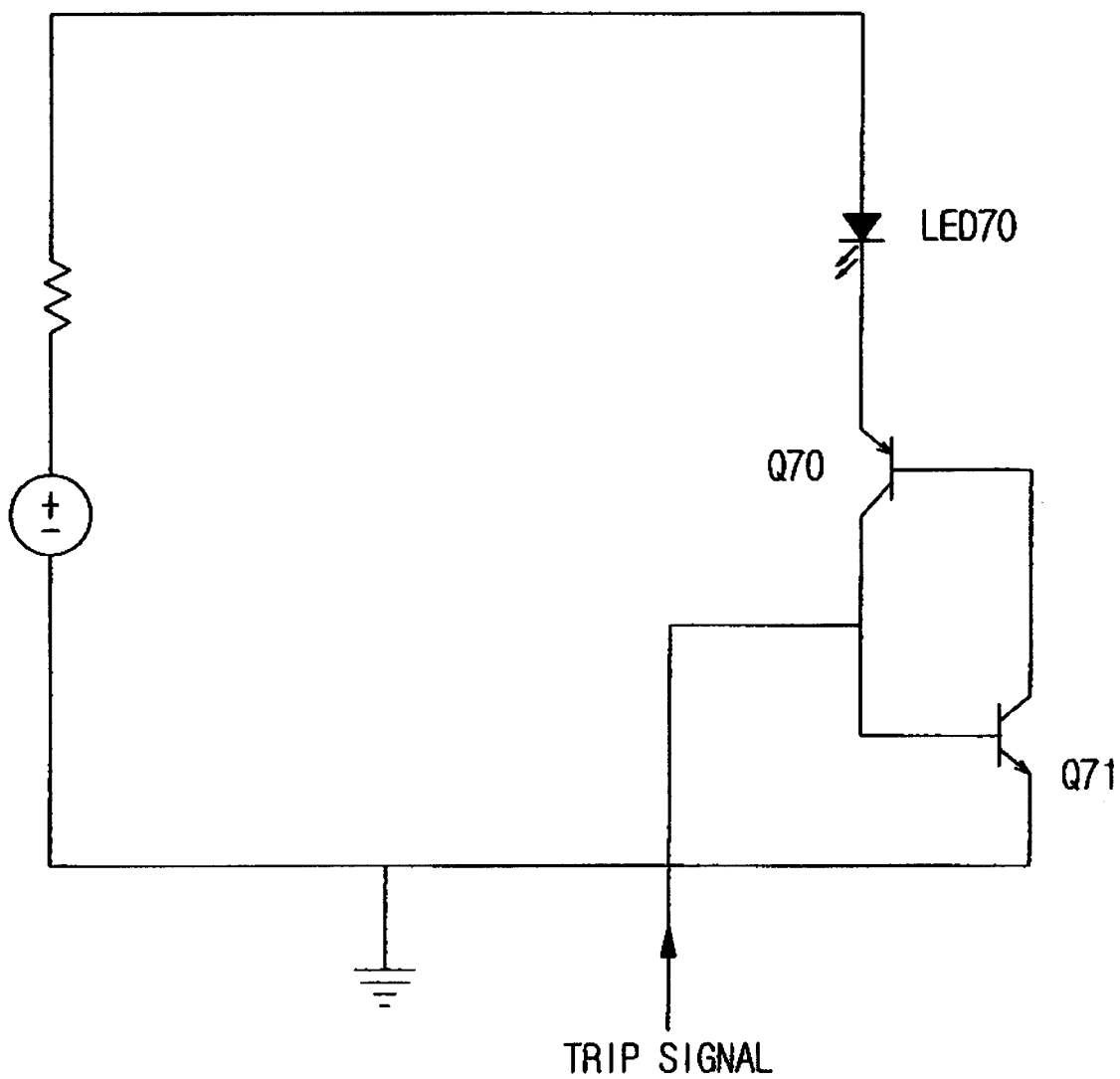
FIG. 7 illustrates a circuit of the display circuitry according to another embodiment of the present invention.

FIG. 7 illustrates a circuit of the display circuitry according to another embodiment of the present invention.

In FIG. 7, the silicon controlled rectifier of FIG. 6 is replaced by two transistors Q70, Q71. For convenience of explanation, one part of three display parts is illustrated in FIG. 7.

As shown in FIG. 7, according to another embodiment of the present invention, the light emitting diode LED70 is coupled to the emitter of the PNP transistor Q70, the base of the PNP transistor Q70 is coupled to the collector of the NPN transistor Q71. The trip signal is provided to the collector of the PNP transistor Q70 and base of the NPN transistor Q71.

If the trip signal is not provided, NPN transistor Q71 is not turned on as voltage is not provided to the base of the NPN transistor Q71. As the NPN transistor is not turned on, the base of the PNP transistor Q70 is not grounded. Therefore, the PNP transistor is not turned on and there flows no current in the light emitting diode LED 70, which means that the light emitting diode does not emit light.

If the trip signal is provided, voltage is provided to the base of the NPN transistor Q71, and therefore, the collector of the NPN transistor Q71 and the base of the PNP transistor Q71 are grounded. As the base of the PNP transistor Q70 is grounded, the PNP transistor Q70 is turned on. Although the trip signal is instantaneous, as the emitter voltage of the PNP transistor Q70 is applied to the collector of the PNP transistor Q70, voltage is continuously provided to the base of the NPN transistor Q71. Therefore, if the trip signal is provided, the independent source 700, the light emitting diode LED 70, and the two transistors Q70, Q71 form the closed circuit until the circuit is reset.

Figure 8:
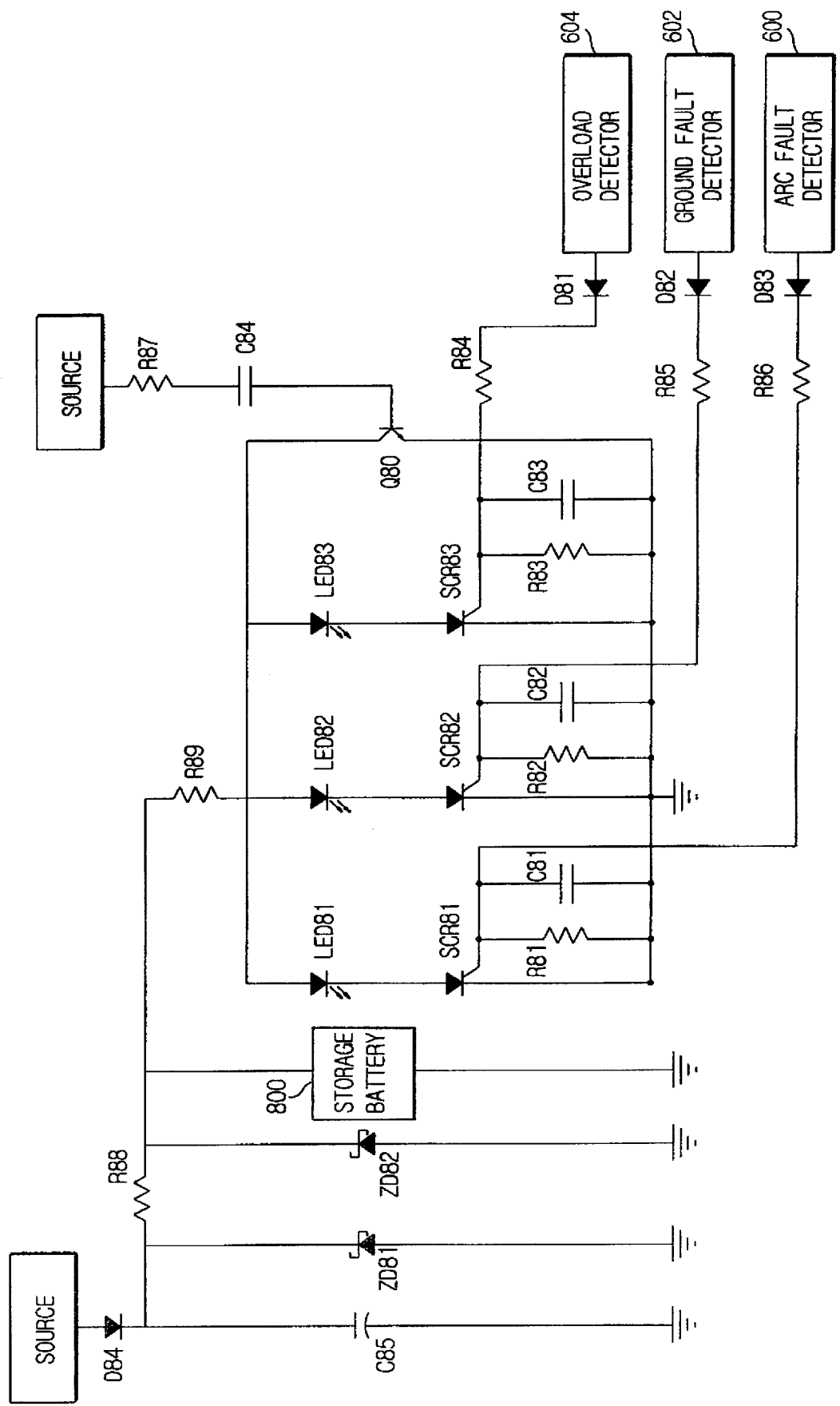
FIG. 8 illustrates a detailed circuit of the display circuitry according to another embodiment of the present invention.

FIG. 8 illustrates a detailed circuit of the display circuitry according to another embodiment of the present invention.

In FIG. 8, the independent source of FIG. 6 is replaced by a storage battery 800. As shown in FIG. 8, voltage is provided to the storage battery from the source if the conductor is not disconnected.

The diode D84 coupled to the source prevents the reverse current, which is the general function of the diode. Two zener diodes ZD1, ZD2 coupled to the cathode of the diode D84 fix the voltage provided to the storage battery 800 in order to provide regular voltage. The resistor R88 coupled between zener diodes ZD1, ZD2 adjusts the magnitude of the current flowing to the storage battery.

If the conductor is disconnected, voltage is not provided to the storage battery 800 and the storage battery independently provides voltage to the display circuitry as the battery of the FIG. 6.

Figure 9:
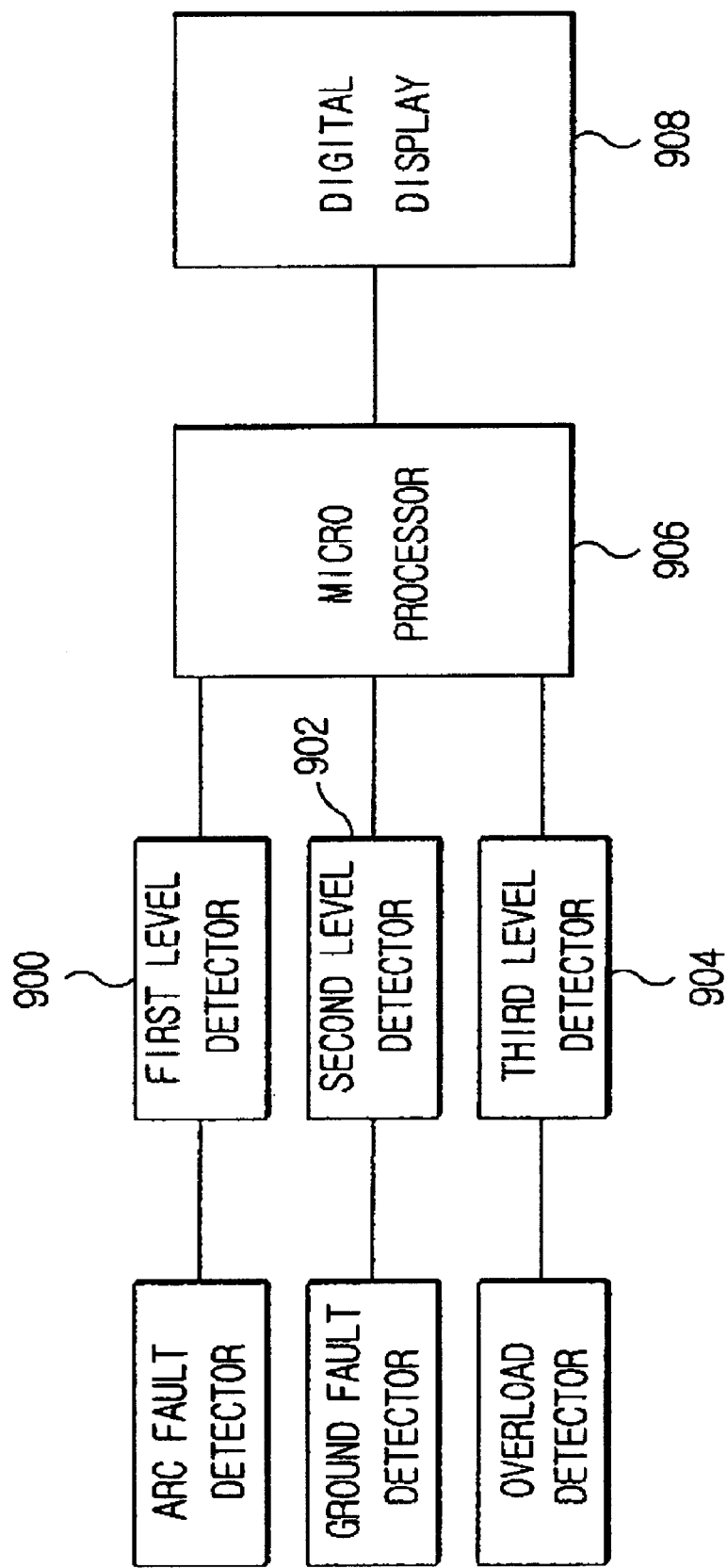
FIG. 9 illustrates a block diagram of the display circuitry according to another embodiment of the present invention.

FIG. 9 illustrates a block diagram of the display circuitry according to another embodiment of the present invention.

As shown in FIG. 9, the display circuitry according to another embodiment of the present invention may include a first level detector 900, a second level detector 902, a third level detector 904, a microprocessor 906 and a digital display 908.

The first level detector determines if the trip signal from the arc fault detector is provided, the second level detector determines if the trip signal from the ground fault detector is provided, and the third level detector determines if the trip signal from the overload detector is provided. If the level detectors 900, 902, 904 receive the trip signal, the level detectors 900, 902, 904 provides an output signal to the microprocessor 906.

The microprocessor receives the output signal from the level detectors 900, 902, 904 and determines the cause of the disconnection. The microprocessor 906 provides a predetermined control signal to the digital display 908 and the digital display 908 displays the cause of the disconnection according to the control signal from the microprocessor.

Figure 10:
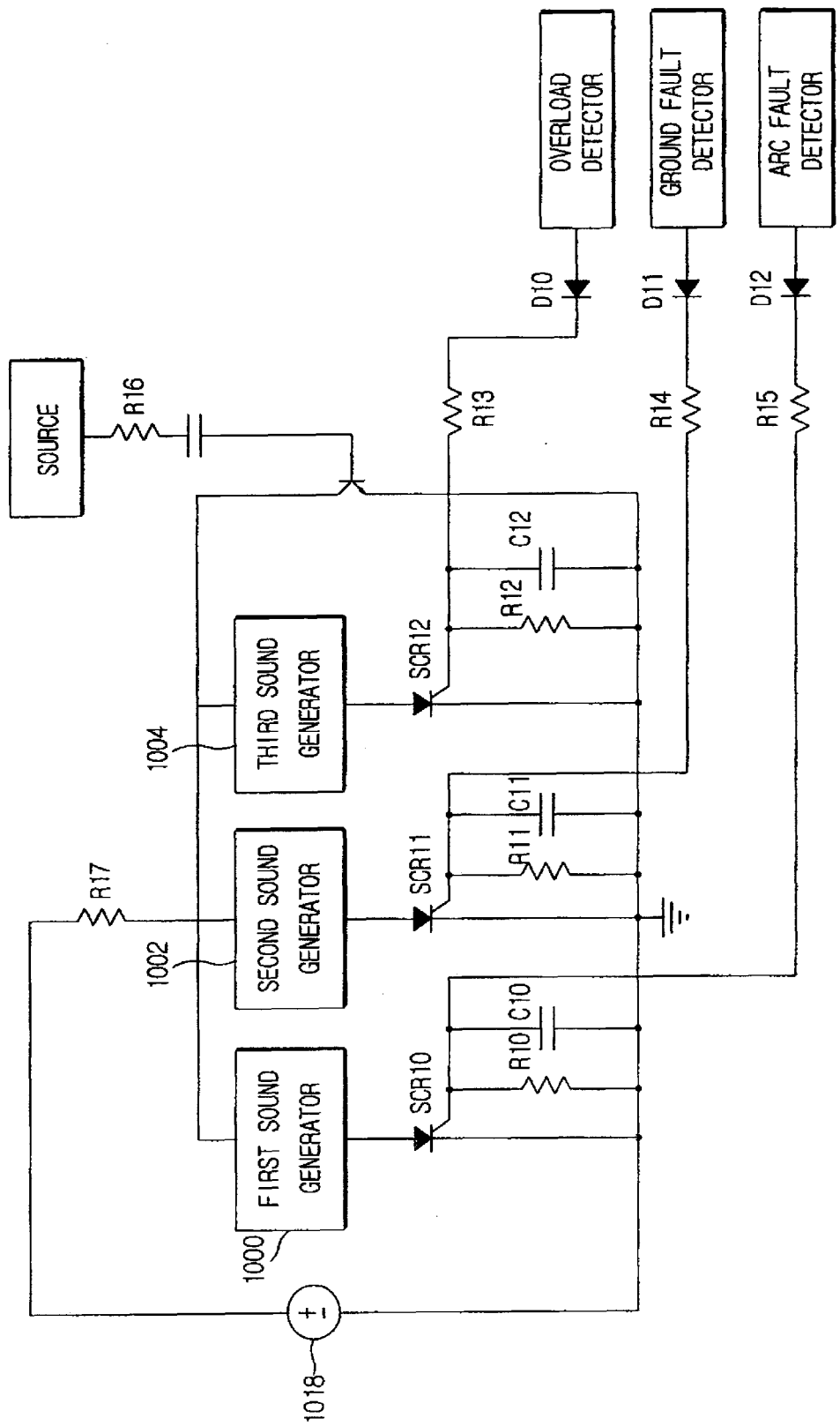
FIG. 10 illustrates a circuit of the display circuitry according to another embodiment of the present invention.

FIG. 10 illustrates a circuit of the display circuitry according to another embodiment of the present invention.

The display circuitry of FIG. 10 expresses the cause of the disconnection by the sound.

In FIG. 10, the light emitting diodes of FIG. 6 are replaced by sound generators 1000, 1002, 1004.

If the trip signal from the arc fault detector is provided to the gate of the silicon controlled rectifier SCR10, the independent source 1018, the first sound generator 1000 and the silicon controlled rectifier form the closed circuit. Therefore the first sound generator 1000 generates a predetermined sound and the second sound generator 1002 and the third sound generator 1004 does not operate at this case.

In order to express the cause of the disconnection using sound, it is preferable that the first sound generator 1000, the second sound generator 1002 and the third sound generator 1004 generate different sounds respectively.

The independent source 1018 can be substituted for a storage battery as is used in the case of FIG. 8. The silicon controlled generators SCR10, SCR11, SCR12 can be substituted for an NPN transistor and a PNP transistor as such as is used in the case of FIG. 7.

According to the present invention's circuit breaker, the cause of the disconnection can be displayed although the source is not provided on account of the disconnection of the conductor.

Further, as the source of the display circuitry is an independent source, the display circuitry is not affected by the high voltage from the outer source.

Moreover, as the circuit breaker of the present invention displays not only the state of the conductor but also the cause of the disconnection, users can determine whether to reconnect the conductor connecting the source and the load.

What is claimed is:

1. A circuit breaker for use in an electric power distribution system, comprising
    at least one of an arc fault detector, a ground fault detector, and an overload detector, the at least one of an arc fault detector, a ground fault detector, and a overload detector disconnecting a conductor coupling a system power source and a load if the at least one of the arc fault detector, the ground fault detector and the overload detector generates a trip signal
    means for displaying the state of the circuit breaker and the cause of the disconnection if the conductor is disconnected by the trip signal generated by said at least one of an arc fault detector, a ground fault detector and an overload detector, so as to provide a user with information as to whether the cause of the disconnection is or is not an arc fault;
    means for resetting said means for displaying if the disconnected conductor is reconnected;
    an independent power source for driving said means for displaying; and
    switching means for switching a connection between said independent source and said means for displaying so that said independent power source drives said means for displaying only when the trip signal is generated.

2. The circuit breaker according to claim 1, wherein said at least one of an arc fault detector, a ground fault detector, and a overload detector includes the arc fault detector, the ground fault detector, and the overload detector, and wherein said means for displaying comprises:
    arc fault display means displaying the state of the arc fault responsive to the trip signal from the arc fault detector;
    ground fault display means displaying the state of the ground fault responsive to the trip signal from the ground fault detector; and
    overload display means displaying the state of overload responsive to the trip signal form the overload detector.

3. The circuit breaker according to claim 2, wherein said switching means comprises a silicon controlled rectifier coupling the independent power source and the means for displaying electrically, responsive to the trip signal.

4. The circuit breaker according to claim 2, wherein said switching means comprises an NPN transistor and a PNP transistor coupling the independent power source and the means for displaying electrically, responsive to the trip signal, wherein the trip signal is provided to the base of the NPN transistor and the collector of the NPN transistor is coupled to the base of the PNP transistor.

5. The circuit breaker according to claim 2, wherein said arc fault display means, said ground fault display means and said overload display means comprise light emitting diodes.

6. The circuit breaker according to claim 1, wherein said reset means comprises a bipolar junction transistor.

7. The circuit breaker according to claim 1, wherein said reset means comprises a field effect transistor.

8. The circuit breaker according to claim 6, wherein said trip signal is provided to a base of the bipolar junction transistor, an emitter of the bipolar junction transistor is grounded, and a collector of the bipolar junction transistor is coupled to the independent power source.

9. The circuit breaker according to claim 1, wherein said at least one of an arc fault detector, a ground fault detector, and a overload detector includes the arc fault detector, the ground fault detector, and the overload detector, and wherein said means for displaying comprises
    a first level detector, a second level detector and a third level detector, wherein the first level detector is coupled to the arc fault detector and generates an output signal in case of receiving the trip signal from the arc fault detector, the second level detector is coupled to the ground fault detector and generates an output signal in case of receiving the trip signal from the ground fault detector, and the third level detector is coupled to the overload detector and generates an output signal in case of receiving the trip signal from the overload detector;
    a microprocessor receiving the output signal from one of the first level detector, the second level detector and the third level detector, determining a state of the conductor and a cause of the disconnection, and generating a control signal according to the result of the determination; and
    a digital display for displaying the state of the conductor and the cause of disconnection, according to the control signal from the microprocessor.

10. The circuit breaker according to claim 1, wherein said independent power source is a battery.

11. The circuit breaker according to claim 1, wherein said independent power source is a storage battery.

12. The circuit breaker according to claim 1, wherein said at least one of an arc fault detector, a ground fault detector, and an overload detector includes an arc fault detector, and wherein said means for displaying comprises
    a level detector coupled to the arc fault detector and generating an output signal in case of receiving the trip signal from the arc fault detector;
    a microprocessor receiving the output signal from the level detector, determining a state of the conductor and a cause of the disconnection, and generating a control signal according to the result of the determination; and
    a digital display for displaying the state of the conductor and the cause of disconnection, according to the control signal from the microprocessor.

13. The circuit breaker according to claim 1, wherein said at least one of an arc fault detector, a ground fault detector, and an overload detector includes a ground fault detector, and wherein said means for displaying comprises
    a level detector coupled to the ground fault detector and generating an output signal in case of receiving the trip signal from the ground fault detector,
    a microprocessor receiving the output signal from the level detector, determining a state of the conductor and a cause of the disconnection, and generating a control signal according to the result of the determination; and
    a digital display for displaying the state of the conductor and the cause of disconnection, according to the control signal from the microprocessor.

14. The circuit breaker according to claim 1, wherein said at least one of an arc fault detector, a ground fault detector, and an overload detector includes an overload detector, and wherein said means for displaying comprises
- a level detector, coupled to the overload detector and generating an output signal in case of receiving the trip signal from the overload detector;
- a microprocessor receiving the output signal from the level detector, determining a state of the conductor and a cause of the disconnection, and generating a control signal according to the result of the determination; and
- a digital display for displaying the state of the conductor and the cause of disconnection, according to the control signal from the microprocessor.

15. A circuit breaker comprising at least one of an arc fault detector, a ground fault detector, and an overload detector, said at least one of an arc fault detector, a ground fault detector, and a overload detector disconnecting a conductor coupling a first power source and a load if the at least one of the arc fault detector, the ground fault detector and the overload detector generates a trip signal, further comprising:
- means for alarming a state of the circuit breaker and a cause of a disconnection by sound if the conductor is disconnected by the trip signal generated by the at least one of the arc fault detector, the ground fault detector and the overload detector, so as to notify a user whether or not a cause of the disconnection is an arc fault;
- means for resetting said means for alarming if the disconnected conductor is reconnected;
- a second power source, independent of the first power source, for driving said means for alarming, and
- means for switching the independent power source and the means for alarming so that the independent power source provides power to the means for alarming only when the trip signal is generated.

16. The circuit breaker according to claim 15, wherein said at least one of an arc fault detector, a ground fault detector, and a overload detector includes the arc fault detector, the ground fault detector, and the overload detector, and wherein said means for alarming comprises
- a first sound generator alarming a state of arc fault responsive to the trip signal from the arc fault detector;
- a second sound generator alarming a state of ground fault responsive to the trip signal from the ground fault detector; and
- a third sound generator alarming a state of overload responsive to the trip signal from the overload detector,
- wherein the first sound generator, the second sound generator and the third sound generator generate the different sounds respectively.

17. The circuit breaker according to claim 16, wherein the switching means comprises a silicon controlled rectifier in order to couple the independent power source and the means for displaying electrically responsive to the trip signal.

* * * * *